US012566354B2

(12) United States Patent
Yonezu et al.

(10) Patent No.: US 12,566,354 B2
(45) Date of Patent: Mar. 3, 2026

(54) MEASURING METHOD FOR OPTICAL NONLINEARITY OF TWO-DIMENSIONAL MATERIAL

(71) Applicant: NTT, Inc., Tokyo (JP)

(72) Inventors: Yuya Yonezu, Musashino (JP); Atsushi Ishizawa, Musashino (JP); Hidetaka Nishi, Musashino (JP); Tai Tsuchizawa, Musashino (JP); Nobuyuki Matsuda, Musashino (JP); Rai Takahashi, Musashino (JP); Koji Yamada, Musashino (JP)

(73) Assignee: NTT, Inc., Tokyo (JP)

( * ) Notice: Subject to any disclaimer, the term of this patent is extended or adjusted under 35 U.S.C. 154(b) by 439 days.

(21) Appl. No.: 18/245,430

(22) PCT Filed: Oct. 1, 2020

(86) PCT No.: PCT/JP2020/037482
§ 371 (c)(1),
(2) Date: Mar. 15, 2023

(87) PCT Pub. No.: WO2022/070395
PCT Pub. Date: Apr. 7, 2022

(65) Prior Publication Data
US 2024/0027870 A1 Jan. 25, 2024

(51) Int. Cl.
*G02F 1/35* (2006.01)
*G01N 21/41* (2006.01)
*G02F 1/365* (2006.01)
(52) U.S. Cl.
CPC ........... *G02F 1/3526* (2013.01); *G01N 21/41* (2013.01); *G02F 1/365* (2013.01)
(58) Field of Classification Search
CPC ........ G02F 1/3526; G02F 1/365; G01N 21/41
See application file for complete search history.

(56) References Cited

U.S. PATENT DOCUMENTS

| | | | | |
|---|---|---|---|---|
| 9,274,274 B1* | 3/2016 | Xu | ............................. | G02F 1/21 |
| 2015/0051740 A1* | 2/2015 | Hiraoka | ................... | F24F 11/58 |
| | | | | 700/276 |

(Continued)

FOREIGN PATENT DOCUMENTS

| | | | | |
|---|---|---|---|---|
| JP | 2016095440 | * | 5/2016 | ............... G02F 1/39 |

OTHER PUBLICATIONS

E. Dremetsika, et al., Measuring the Nonlinear Refractive Index of Graphene Using the Optical Kerr Effect Method, Optics Letters, vol. 41, No. 14, Jul. 15, 2016 (Year: 2016).*

(Continued)

*Primary Examiner* — Catherine T. Rastovski
*Assistant Examiner* — Sharah Zaab
(74) *Attorney, Agent, or Firm* — Workman Nydegger

(57) ABSTRACT

An optical nonlinearity measurement method according to the present disclosure utilizes photon pair generation through a spontaneous four-wave mixing process, to observe photon pairs using an optical waveguide loaded with a two-dimensional material. Compared with the Z-scan method, the influence of free carriers on nonlinear refractive indexes is only indirect. With a parameter being the length of the attached two-dimensional material in the optical waveguide direction, a theoretical value of the coincidence rate of the photon pairs based on the coupled wave equation is fitted to a measured value of the coincidence rate of the photon pairs. For the coincidence rate of the photon pairs, the theoretical value based on the coupled wave equation is fitted to the measured value in a state reflecting the structure of the optical waveguide loaded with the two-dimensional material, and nonlinear coefficients $\gamma_1$ and $\gamma_2$ at that time are obtained.

4 Claims, 4 Drawing Sheets

(56)  References Cited

U.S. PATENT DOCUMENTS

2015/0055961 A1 *  2/2015  Meyers ................. H04B 10/70
                                                     398/140
2019/0187380 A1 *  6/2019  Fanto ...................... G02B 6/12

OTHER PUBLICATIONS

H. Zhang, et al., *Z-Scan Measurement of the Nonlinear Refractive Index of Graphene*, Optics Letters, vol. 37, No. 11, Jun. 1, 2012, pp. 1856-1858.
W. Chen, et al., *The Nonlinear Optical Properties of Coupling and Decoupling Graphene Layers*, AIP Advances 3, 042123, 2013, pp. 1-10.
E. Dremetsika, et al., *Measuring the Nonlinear Refractive Index of Graphene Using the Optical Kerr Effect Method*, Optics Letters, vol. 41, No. 14, Jul. 15, 2016, pp. 3281-3284.

* cited by examiner

Fig. 2

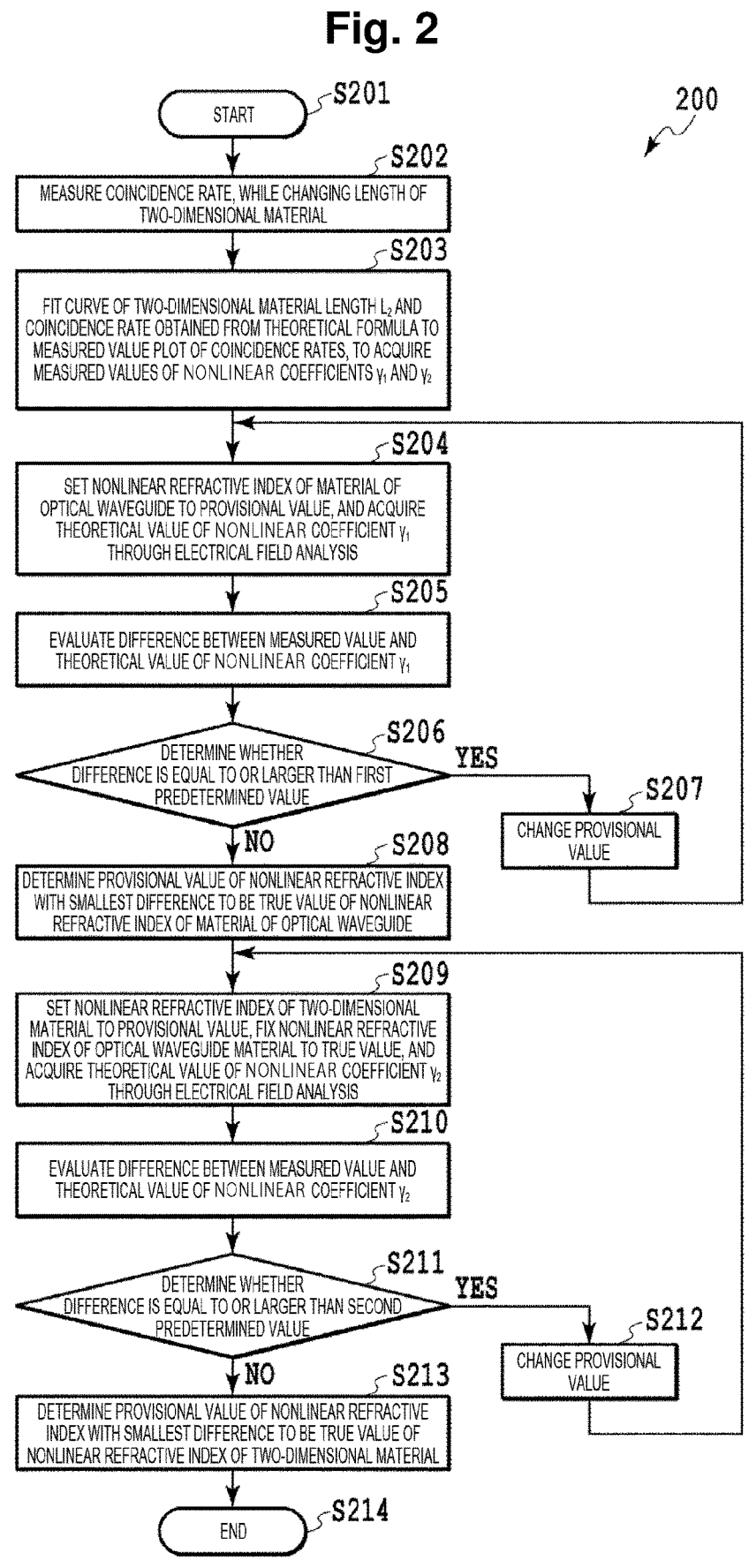

S201 START

S202 MEASURE COINCIDENCE RATE, WHILE CHANGING LENGTH OF TWO-DIMENSIONAL MATERIAL

S203 FIT CURVE OF TWO-DIMENSIONAL MATERIAL LENGTH $L_2$ AND COINCIDENCE RATE OBTAINED FROM THEORETICAL FORMULA TO MEASURED VALUE PLOT OF COINCIDENCE RATES, TO ACQUIRE MEASURED VALUES OF NONLINEAR COEFFICIENTS $\gamma_1$ AND $\gamma_2$

S204 SET NONLINEAR REFRACTIVE INDEX OF MATERIAL OF OPTICAL WAVEGUIDE TO PROVISIONAL VALUE, AND ACQUIRE THEORETICAL VALUE OF NONLINEAR COEFFICIENT $\gamma_1$ THROUGH ELECTRICAL FIELD ANALYSIS

S205 EVALUATE DIFFERENCE BETWEEN MEASURED VALUE AND THEORETICAL VALUE OF NONLINEAR COEFFICIENT $\gamma_1$

S206 DETERMINE WHETHER DIFFERENCE IS EQUAL TO OR LARGER THAN FIRST PREDETERMINED VALUE — YES → S207 CHANGE PROVISIONAL VALUE

NO

S208 DETERMINE PROVISIONAL VALUE OF NONLINEAR REFRACTIVE INDEX WITH SMALLEST DIFFERENCE TO BE TRUE VALUE OF NONLINEAR REFRACTIVE INDEX OF MATERIAL OF OPTICAL WAVEGUIDE

S209 SET NONLINEAR REFRACTIVE INDEX OF TWO-DIMENSIONAL MATERIAL TO PROVISIONAL VALUE, FIX NONLINEAR REFRACTIVE INDEX OF OPTICAL WAVEGUIDE MATERIAL TO TRUE VALUE, AND ACQUIRE THEORETICAL VALUE OF NONLINEAR COEFFICIENT $\gamma_2$ THROUGH ELECTRICAL FIELD ANALYSIS

S210 EVALUATE DIFFERENCE BETWEEN MEASURED VALUE AND THEORETICAL VALUE OF NONLINEAR COEFFICIENT $\gamma_2$

S211 DETERMINE WHETHER DIFFERENCE IS EQUAL TO OR LARGER THAN SECOND PREDETERMINED VALUE — YES → S212 CHANGE PROVISIONAL VALUE

NO

S213 DETERMINE PROVISIONAL VALUE OF NONLINEAR REFRACTIVE INDEX WITH SMALLEST DIFFERENCE TO BE TRUE VALUE OF NONLINEAR REFRACTIVE INDEX OF TWO-DIMENSIONAL MATERIAL

S214 END

200

MEASURING METHOD FOR OPTICAL NONLINEARITY OF TWO-DIMENSIONAL MATERIAL

TECHNICAL FIELD

The present invention relates to a method for measuring optical nonlinearity of a two-dimensional material.

BACKGROUND ART

A structure in which a substance is made as thin as possible to form one layer of atoms is called a two-dimensional substance (material). For example, graphene in which graphite is used as a single-layer sheet of carbon atoms has unique properties different from those of graphite, and is also expected to be applied to optoelectronic devices. To develop a two-dimensional material in a new optoelectronic device, it is necessary to accurately know the optical properties of the two-dimensional material. For example, it is important to quantitatively measure optical nonlinearity such as the nonlinear coefficient (the nonlinear refractive index) of a two-dimensional material.

As methods for measuring optical nonlinearity, there are known methods using various nonlinear optical effects, such as Z-scan, optical heterodyne detection, stimulated four-wave mixing, self-phase modulation, and harmonic generation is known. A Z-scan method is a simple method by which a sample is irradiated with laser light condensed thereon, and a change in intensity of transmitted light is measured while the sample is scanned in the light traveling direction. A plurality of conventional techniques has reported results of measurement using a Z-scan method in measuring the nonlinear refractive index of graphene (Non Patent Literatures 1 to 3).

CITATION LIST

Non Patent Literature

Non Patent Literature 1: H. Zhang, et al., "Z-scan measurement of the nonlinear refractive index of graphene", Optics Letters 37, 1856-1858, 2012

Non Patent Literature 2: W. Chen, et al., "The nonlinear optical properties of coupling and decoupling graphene layers", AIP ADVANCES 3, 042123, 2013

Non Patent Literature 3: E. Dremetsika, et al., "Measuring the nonlinear refractive index of graphene using the optical Kerr effect method", Optics Letters 41, 3281-3284, 2016

SUMMARY OF INVENTION

Technical Problem

However, in a case where the optical nonlinearity of a two-dimensional material is measured by a Z-scan method, the contribution of the nonlinearity derived from free carriers cannot be distinguished from measurement results. In Non Patent Literatures 1 to 3, there are variations due to a device manufacturing method, experimental conditions, presence or absence of the contribution of free carriers, and the like. Mainly due to the presence/absence of the contribution of nonlinearity derived from free carriers, the variation among measured values of the nonlinear refractive index of graphene by a Z-scan method is in a range of three orders of magnitude ($10^{-11}$ to $10^{-13}$ $m^2/W$).

Further, in a case where the optical nonlinearity of a two-dimensional material is measured, it is difficult to measure the optical nonlinearity of the material (base material) loaded (attached) with the two-dimensional material and the optical nonlinearity of the two-dimensional material separately from each other. For example, when a two-dimensional material is formed on an optical waveguide, the base material of the optical waveguide and the two-dimensional material interact with each other. The nonlinear coefficient of the two-dimensional material deviates from the material-specific value (the nonlinear refractive index) of the two-dimensional material existing alone, and indicates a value depending on the optical waveguide structure. The nonlinear refractive index of a two-dimensional material attached onto an optical waveguide having a specific structure is observed as a nonlinear coefficient that varies depending on the optical waveguide structure.

The present invention has been made in view of the above problems, and an objective thereof is to provide an optical nonlinearity measurement method by which the contribution of nonlinearity derived from free carriers can be reduced, and the optical nonlinearity of a base material loaded with a two-dimensional material can be distinguished from the optical nonlinearity of the two-dimensional material.

Solution to Problem

One mode of the present invention is a method for measuring the nonlinear optical properties of a two-dimensional material, and is a method that includes: providing a plurality of test devices that have different structures and each include an optical waveguide partially loaded with a two-dimensional material, each two-dimensional material having a different length in the optical waveguide axial direction; measuring the coincidence rate of photon pairs generated in the optical waveguide after pump light pulse has entered the optical waveguide in each of the test devices; fitting a theoretical-value-based coincidence rate of photon pairs obtained on the basis of a coupled wave equation to an actual-measurement-based coincidence rate corresponding to the different length, the actual-measurement-based coincidence rate being obtained through the measurement; and determining the nonlinear coefficient $\gamma_1$ of the optical waveguide alone and the nonlinear coefficient $\gamma_2$ of the optical waveguide loaded with the two-dimensional material.

Advantageous Effects of Invention

The present invention provides a measurement method by which the contribution of nonlinearity derived from free carriers can be reduced, and the optical nonlinearity of a base material loaded with a two-dimensional material can be distinguished from the optical nonlinearity of the two-dimensional material.

BRIEF DESCRIPTION OF DRAWINGS

FIG. 2 is a flowchart schematically showing the procedures in the method for measuring nonlinear optical properties according to the present disclosure.

DESCRIPTION OF EMBODIMENTS

Figure 1:
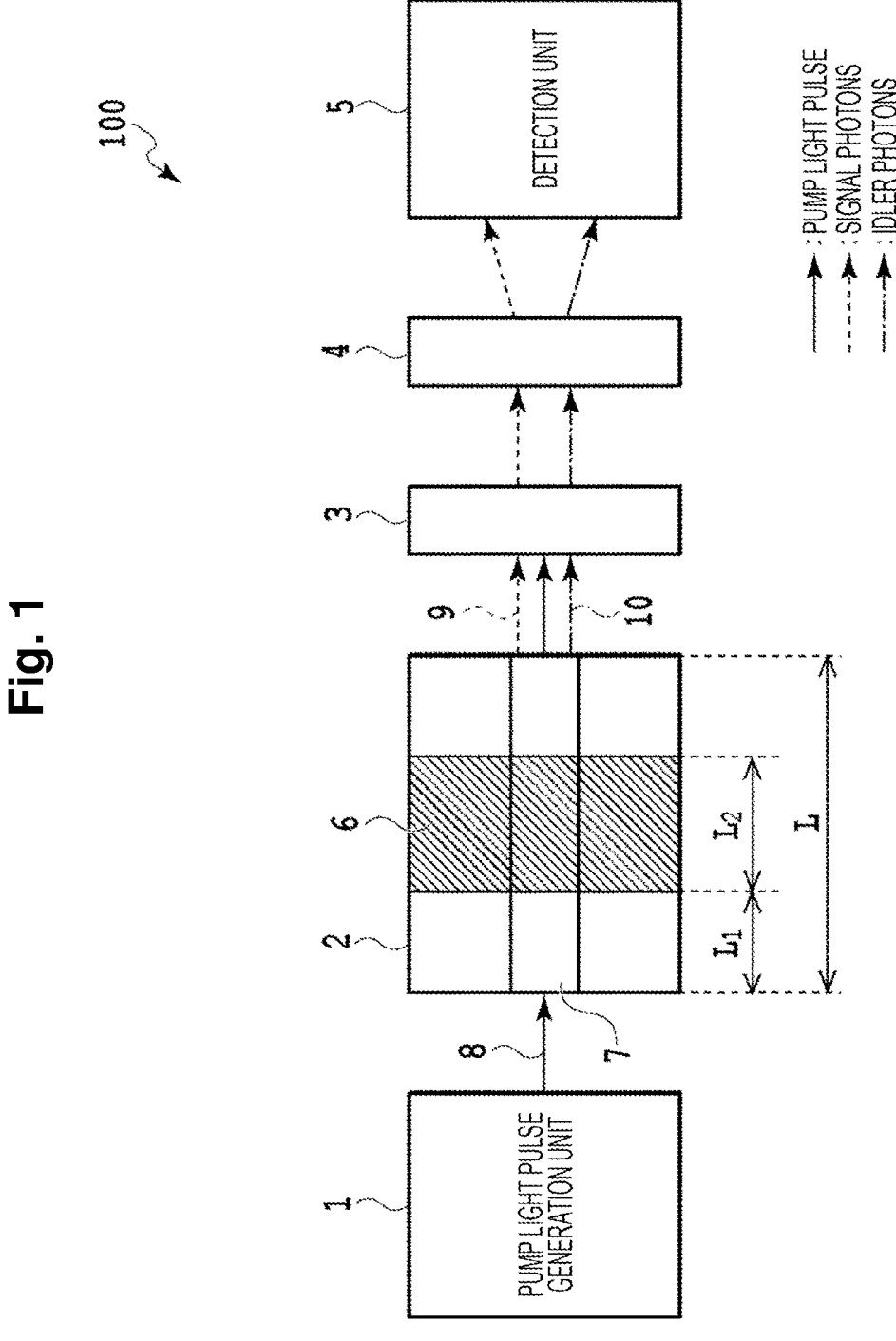
FIG. 1 is a schematic diagram of a measurement system for a method for measuring nonlinear optical properties of a two-dimensional material according to the present disclosure.

An optical nonlinearity measurement method according to the present disclosure utilizes photon pair generation through a spontaneous four-wave mixing process, to observe photon pairs using an optical waveguide loaded with a two-dimensional material. Compared with the Z-scan method, the influence of free carriers on nonlinear refractive indexes is only indirect. With a parameter being the length of the attached two-dimensional material in the optical waveguide direction, a theoretical value of the coincidence rate of the photon pairs based on the coupled wave equation is fitted to (matched with) a measured value of the coincidence rate of the photon pairs. For the coincidence rate of the photon pairs, the theoretical value based on the coupled wave equation is fitted to the measured value in a state reflecting the structure of the optical waveguide loaded with the two-dimensional material, and nonlinear coefficients $\gamma_1$ and $\gamma_2$ at that time are obtained. Further, the nonlinear coefficients $\gamma_1$ and $\gamma_2$ that are measured values obtained by fitting are compared theoretical values of the nonlinear coefficients $\gamma_1$ and $\gamma_2$ calculated from an electrical field distribution in the cross-sectional direction of the optical waveguide on the basis of a provisional value of the nonlinear refractive index. The provisional value at the time when the measured value obtained by fitting and the theoretical value obtained based on an electrical field distribution are the same can also be obtained as the true value of the nonlinear refractive index.

The inventors considered that the contribution of the nonlinearity of free carriers affects the large variation in the reported values of nonlinear refractive indexes disclosed in Non Patent Literatures 1 to 3 of the related art. The contribution of nonlinearity derived from free carriers means a change caused in refractive index by free carriers stimulated when a substance is irradiated with light. In general, the nonlinear refractive index in nonlinear optical properties corresponds to a refractive index change (an optical Kerr effect) caused by bound carriers depending on the intensity of light irradiating a substance. It is considered that, by the Z-scan methods disclosed in the cited literatures 1 to 3, a refractive index change derived from free carriers and a refractive index change derived from bound carriers are observed in an overlapping manner.

A Z-scan method is a method for measuring nonlinear optical properties by observing a phenomenon (an optical Kerr lens effect) in which a substance acts like a lens, and light is narrowed by a refractive index change that is caused depending on the intensity of the light irradiating the substance. By the Z-scan method, not only a change caused in refractive index by bound carriers (an optical Kerr effect) but also a change caused in refractive index caused free carriers is directly observed at the same time.

Therefore, the inventors have focused on utilizing photon pair generation in a spontaneous four-wave mixing process as a mechanism that is hardly affected by a refractive index change caused by free carriers. Four-wave mixing is known as a nonlinear optical phenomenon in which light of some other wavelength satisfying the phase matching conditions (the energy conservation law and the momentum conservation law) is generated when a substance is irradiated with pump light of a certain wavelength. The four-wave mixing differs from a Z-scan method in that a change caused in the refractive index of a target substance by free carriers only indirectly affects the four-wave mixing. Specifically, the possible indirect influence is the phase modulation of the pump light due to the refractive index change caused by the free carriers. However, it is possible to sufficiently reduce the influence of the phase modulation of the pump light, by selecting the shape of the optical waveguide to be used for measurement and the input pump light power so as to satisfy the phase matching conditions.

Photon pair generation through a spontaneous four-wave mixing process has been actively studied as an experimental method of photon pair generation that is used in the fields of quantum optics, quantum information, and the like. An optical nonlinearity measurement method according to the present disclosure suggests a novel method for measuring nonlinear optical properties by using photon pair generation caused through a spontaneous four-wave mixing process, observing the photon pair generation with an optical waveguide loaded with a two-dimensional material, and comparing a theoretically obtained coincidence rate with an actually measured value. In the description below, a configuration and procedures for a method for measuring nonlinear optical properties according to the present disclosure will be described with reference to the drawings.

FIG. 1 is a schematic diagram of a measurement system for a method for measuring nonlinear optical properties of a two-dimensional material according to the present disclosure. A measurement system 100 includes a pump light pulse generation unit 1, an optical waveguide 2 partially loaded with a two-dimensional material, a pump light pulse filter 3, a filter 4 that separates generated photon pairs, and a detection unit 5. The pump light pulse generation unit 1 generates a pump light pulse 8 in which the wavelength, the duration, the repetition frequency, the optical power, and the polarization are controlled. The pump light pulse 8 output from the pump light pulse generation unit 1 is made to enter the optical waveguide 2 that is partially loaded with a two-dimensional material 6 and has a waveguide length L. The optical waveguide 2 includes an optical waveguide core 7 that is formed on a substrate and does not have any overcladding, and the two-dimensional material 6 attached onto the core 7.

The incident pump light pulse 8 causes a spontaneous four-wave mixing process in the optical waveguide 2 partially loaded with the two-dimensional material 6, and photon pairs of different wavelengths, which are signal photons 9 and idler photons 10, are generated. The pump light pulse that has propagated through the optical waveguide 2 is removed by the pump light pulse filter 3. The photon pairs generated in the optical waveguide 2 are separated into signal photons and idler photons by the filter 4, and are made to enter the detection unit 5. The detection unit 5 detects the signal photons and the idler photons with single-photon detectors, and measures the coincidence rate.

In the optical waveguide in which the two-dimensional material 6 is loaded on the core 7, the entry waveguide length $L_1$ to the two-dimensional material 6 and the length $L_2$ of the two-dimensional material are changed as structural parameters. The coincidence rate is measured with respect to a plurality of different combinations of $L_1$ and $L_2$. That is, a plurality of test devices including optical waveguides that have different structures and are partially loaded with two-dimensional materials is prepared. In each of the test devices, the two-dimensional material has a different length in the optical waveguide axial direction. At the length $L_2$ of the two-dimensional material corresponding to each of the test devices, the coincidence rate of the photon pairs is determined, and the nonlinear coefficient γ is determined from the plotted points and the theoretical value curve in the $L_2$-coincidence rate space as described later. Here, the relationship between the nonlinear refractive index $n_2$ and the nonlinear coefficient γ is defined as follows.

Nonlinear refractive index $n_2$: the index indicating the optical nonlinearity inherent to the material Nonlinear coefficient γ: the index indicating the optical nonlinearity depending on the electrical field distribution of the light propagating in the optical waveguide From the above definition, the nonlinear refractive index $n_2$ can be rephrased as a value determined by the material not depending on the structure of the optical waveguide, and the nonlinear coefficient γ can be rephrased as the effective optical nonlinearity to be felt by the light depending on the structure of the optical waveguide. After the material and the shape are determined, the "nonlinear refractive index $n_2$" and the "nonlinear coefficient γ" are associated with each other by Expression (1) shown below.

$$\gamma = \frac{2\pi}{\lambda} \frac{\iint n_2(x, y)|E(x, y)|^4 \ dx \ dy}{\left(\iint |E(x, y)|^2 \ dx \ dy\right)^2}$$

Expression (1)

In Expression (1), λ represents the wavelength of the light, E(x, y) represents the electrical field distribution in a cross-sectional direction of the light propagating in the optical waveguide, and $n_2(x, y)$ represents the nonlinear refractive index distribution in the cross-sectional direction of the optical waveguide. According to Expression (1), the value calculated using $n_2(x, y)$ in the state of the optical waveguide alone is a nonlinear coefficient $\gamma_1$, and the value calculated using $n_2(x, y)$ in the state where the two-dimensional material is loaded in the optical waveguide having a specific structure is a nonlinear coefficient $\gamma_2$.

With respect to the measured value of the photon pair coincidence rate obtained by the detection unit 5 of the measurement system 100 in FIG. 1, fitting is performed by adjusting the theoretical value $\mu_{theory}$ of the coincidence rate obtained from a theoretical formula based on the coupled wave equation to the measured value, while changing the nonlinear coefficients $\gamma_1$ and $\gamma_2$. Specifically, as will be described later with reference to FIG. 3, the curve of the theoretical value $\mu_{theory}$ is adjusted to a plurality of plotted points of the coincidence rates of different optical waveguide structures that vary in $L_1$ and $L_2$. As the nonlinear coefficients $\gamma_1$ and $\gamma_2$ at the time when the theoretical value of the coincidence rate become closest to plotted points of measured values, the nonlinear coefficients determined by the material and the structure of the optical waveguide 2 partially loaded with the two-dimensional material 6 are obtained.

$$\mu_{theory} = \Delta v \Delta \tau G^2 \eta^2$$

Expression (2)

$$G = P_p \left[ \gamma_1 \frac{1 - e^{-\alpha_1 L_1}}{\alpha_1} + \right.$$

Expression (5)

$$\left. \gamma_2 e^{-\alpha_1 L_1} \frac{1 - e^{-\alpha_2 L_2}}{\alpha_2} + \gamma_1 e^{-\alpha_1 L_1} e^{-\alpha_2 L_2} \frac{1 - e^{-\alpha_1(L-L_1-L_2)}}{\alpha_1} \right]$$

$$\eta = e^{-\alpha_1(L-L_2)} e^{-\alpha_2 L_2}$$

Expression (4)

In Expressions (2) to (4) shown above, the parameter definitions are as follows.

Δv: the bandwidth of the filter that separates generated photon pairs

Δτ: the duration of the pump light pulse $P_p$: the peak power of the pump light pulse $\gamma_1$: the nonlinear coefficient of the optical waveguide alone $\gamma_2$: the nonlinear coefficient of the optical waveguide loaded with the two-dimensional material $\alpha_1$: the propagation loss α of the waveguide alone $\alpha_2$: the propagation loss of the optical waveguide loaded with the two-dimensional material L: the total length of the optical waveguide $L_1$: the length of the optical waveguide alone on the entry side $L_2$: the length of the loaded two-dimensional material Among the above parameters, the propagation loss $\alpha_1$ of the optical waveguide alone and the propagation loss $\alpha_2$ of the optical waveguide loaded with the two-dimensional material can be obtained by a method for measuring a propagation loss of an optical waveguide, such as a cutback method, independently of this measurement method. The above-mentioned method for adjusting the curve of the theoretical value $\mu_{theory}$ to the plurality of plotted points of coincidence rates can be selected from among various methods, and is not limited to any specific method herein. One example of such a method is a method using a nonlinear least squares method such as the Levenberg-Marquardt method.

As described above, utilizing the photon pair generation in the spontaneous four-wave mixing process, the nonlinear coefficients $\gamma_1$ and $\gamma_2$ at the time when the theoretical value of the coincidence rate becomes closest to the plot of the measured values are the actual-measurement-based nonlinear coefficients in the state of the optical waveguide having a specific structure and in the state where the two-dimensional material is loaded into the optical waveguide, respectively. Further, by comparing the obtained actual-measurement-based nonlinear coefficient with the theoretical-value-based nonlinear coefficients $\gamma_1$ and $\gamma_2$ theoretically obtained through an electrical field analysis of the optical waveguide having the specific structure, it is possible to calculate the respective values of the nonlinear refractive indexes of the material of the optical waveguide and the attached two-dimensional material.

Specifically, the value of the nonlinear refractive index of the material of the optical waveguide is first set to a provisional value. With the use of this provisional value, the theoretical-value-based nonlinear coefficient $\gamma_1$ of the optical waveguide alone is calculated from the electrical field distribution in the cross-sectional direction of the optical waveguide obtained by a numerical calculation method such as a finite element method or a finite-difference time-domain method. The obtained theoretical-value-based nonlinear coefficient $\gamma_1$ is then compared with the actual-measurement-based nonlinear coefficient $\gamma_1$ obtained from fitting, and the difference is evaluated. When the difference is equal to or larger than a first predetermined value, the provisional value of the nonlinear refractive index of the material of the optical waveguide is changed. The theoretical-value-based nonlinear coefficient $\gamma_1$ is then calculated with the updated provisional value, and difference evaluation is repeated. When the difference becomes smaller than the first predetermined value, and the theoretical-value-based and actual-measurement-based nonlinear coefficients $\gamma_1$ sufficiently fit, the provisional value (the current provisional value) of the nonlinear refractive index of the material of the optical waveguide at that time is determined to be the true value of the nonlinear refractive index of the material of the optical waveguide.

Next, the nonlinear refractive index of the two-dimensional material is determined through the same procedures as the above-described procedures for determining the true value of the nonlinear refractive index of the material of the optical waveguide. That is, the value of the nonlinear refractive index of the two-dimensional material is set to a provisional value this time. With the use of this provisional value and the true value of the nonlinear refractive index of the material of the optical waveguide determined through the above procedures, the theoretical-value-based nonlinear coefficient $\gamma_2$ of the optical waveguide loaded with the two-dimensional material is calculated from the electrical field distribution in the cross-sectional direction of the optical waveguide. The obtained theoretical-value-based nonlinear coefficient $\gamma_2$ is compared with the actual-measurement-based nonlinear coefficient $\gamma_2$ obtained from fitting, and the difference is evaluated. When the difference is equal to or larger than a second predetermined value, the provisional value of the nonlinear refractive index of the two-dimensional material is changed. The theoretical-value-based nonlinear coefficient $\gamma_2$ is then calculated with the updated provisional value, and difference evaluation is repeated. When the difference becomes smaller than the second predetermined value, and the theoretical-value-based and actual-measurement-based nonlinear coefficients $\gamma_2$ sufficiently fit, the provisional value (the current provisional value) of the nonlinear refractive index of the two-dimensional material at that time is determined to be the true value of the nonlinear refractive index of the two-dimensional material.

The definition of the difference, the setting of the first predetermined value and the second predetermined value as the fitting determination thresholds, the amount of change in the provisional value at a time of update, and the like can be set in various manners, together with the algorithm for convergence, and detailed explanation of them is not made herein. The above series of procedures in the method for measuring optical nonlinearity according to the present disclosure are described below as a flowchart.

FIG. 2 is a flowchart roughly showing the procedures in the method for measuring nonlinear optical properties according to the present disclosure. A measurement method 200 starts as an actual-measurement-based nonlinear coefficient acquisition process (S201). A two-dimensional material is first formed on the region of a portion of the core of the optical waveguide, to prepare an optical waveguide of a different structure loaded with the two-dimensional material. For example, the position ($L_1$, which corresponds to length of the entry waveguide) and the length ($L_2$) of the two-dimensional material in the optical waveguide axial direction can be changed.

Next, in S202, with the measurement system having the configuration illustrated in FIG. 1, a coincidence rate of signal photons and idler photons is measured from an optical waveguide loaded with a two-dimensional material having a different length in the direction of the optical waveguide. Generation of photon pairs in devices of different structures that vary in $L_1$ and $L_2$ as described above is detected, and thus, a measured value of the coincidence rate $\mu$ per pulse is acquired.

Next, in S203, the curve of the two-dimensional material length $L_2$—the coincidence rate $\mu_{theory}$ obtained from a theoretical formula is fitted to the measured value plot of the coincidence rate obtained in S202, and thus, the actual-measurement-based nonlinear coefficients $\gamma_1$ and $\gamma_2$ are acquired. The theoretical formula $\mu_{theory}$ is Expressions (2) to (4) described above. Here, a specific example in which the coincidence rate $\mu_{theory}$ according to the theoretical formula is fitted to a measured value is described with reference to FIG. 3.

Figure 3:
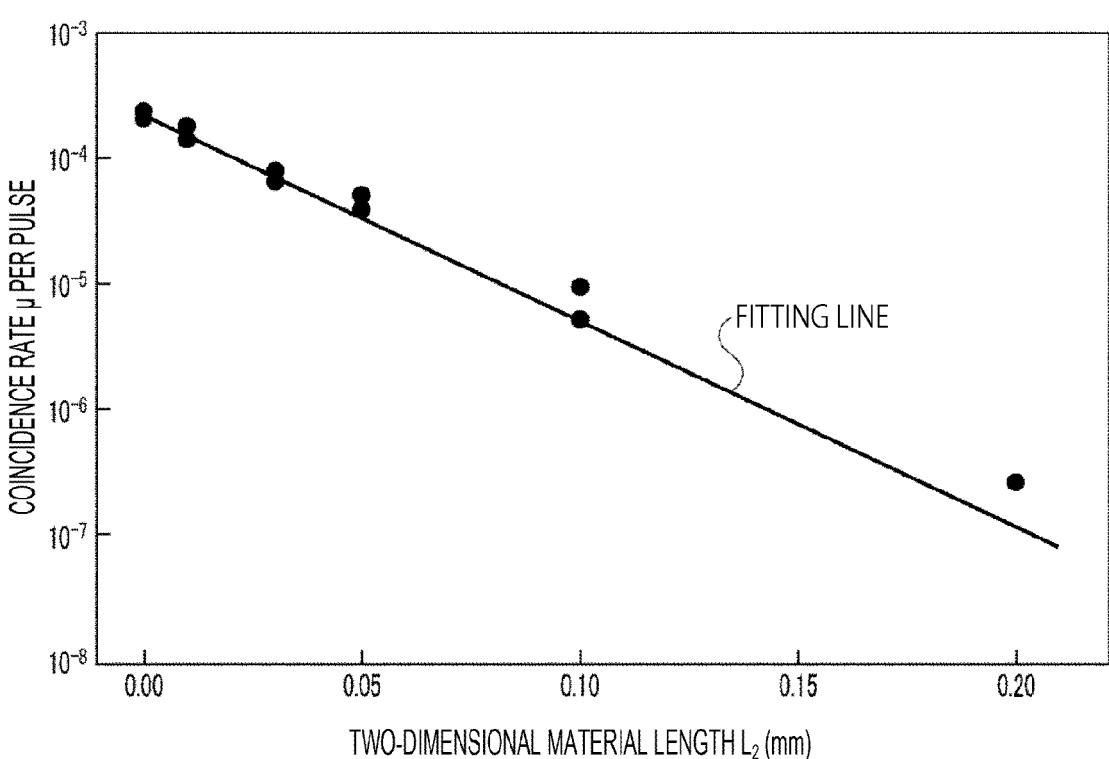
FIG. 3 is a graph illustrating the coincidence rate of a photon pair in an optical waveguide loaded with a two-dimensional material.

FIG. 3 is a graph illustrating the coincidence rate of photon pairs, using an optical waveguide loaded with a two-dimensional material. FIG. 3 shows the coincidence rate of photon pairs in a case where a light pulse modulated with a duration of 20 ps and a repetition frequency of 1 GHz is made to enter a graphene-loaded silicon optical waveguide in an example described later. The abscissa axis indicates the length $L_2$ (mm, see FIG. 1) of the loaded graphene, and the ordinate axis indicates the coincidence rate $\mu$ of generated photon pairs per pulse. The plotted points in FIG. 3 correspond to the measured values of the coincidence rates with respect to devices having different structures that vary in $L_1$ and $L_2$, in S202 of the flowchart in FIG. 2.

The solid line in FIG. 3 is the theoretical curve $\mu_{theory}$ obtained by performing fitting while changing the nonlinear coefficients $\gamma_1$ and $\gamma_2$, using the theoretical formulas (2) to (4) for coincidence rates of photon pairs based on the coupled wave equation. FIG. 3 illustrates a state in which fitting is completed, and the nonlinear coefficients $\gamma_1$ and $\gamma_2$ that give this fitting curve can be determined.

Accordingly, a measurement method according to the present disclosure is a method for measuring the nonlinear optical properties of a two-dimensional material, and can be implemented as a method that includes: providing a plurality of test devices that have different structures and each include an optical waveguide partially loaded with a two-dimensional material, each two-dimensional material having a different length in the optical waveguide axial direction; measuring the coincidence rate of photon pairs generated in the optical waveguide after pump light pulse has entered the optical waveguide in each of the test devices; fitting a theoretical-value-based coincidence rate of photon pairs obtained on the basis of a coupled wave equation to an actual-measurement-based coincidence rate corresponding to the different length, the actual-measurement-based coincidence rate being obtained through the measurement; and determining the nonlinear coefficient $\gamma_1$ of the optical waveguide alone and the nonlinear coefficient $\gamma_2$ of the optical waveguide loaded with the two-dimensional material.

Referring back to the flowchart in FIG. 2, after the actual-measurement-based nonlinear coefficients $\gamma_1$ and $\gamma_2$ are obtained in S203, the values of the nonlinear refractive indexes of the material of the optical waveguide and the attached two-dimensional material are obtained in S204 to 213.

In S204, the nonlinear refractive index of the material of the optical waveguide is set to a provisional value, and the theoretical value of the nonlinear coefficient $\gamma_1$ is acquired through an electrical field analysis using a numerical calculation method such as a finite element method or a time domain difference method.

Next, in S205, the difference between the actual-measurement-based nonlinear coefficient $\gamma_1$ obtained in S203 and the theoretical-value-based nonlinear coefficient $\gamma_1$ obtained in S204 is evaluated.

In S206, the difference value obtained in S205 is compared with a first predetermined value. If the difference value is equal to or greater than the first predetermined value (threshold) (Y), the process moves on to S207, and the provisional value of the nonlinear refractive index of the material of the optical waveguide that has been set in S204 is changed. Steps S204 to 206 are repeated, using the updated provisional value of the nonlinear refractive index. If the difference value is smaller than the predetermined value (N), the process moves on to S208.

In S208, the provisional value of the nonlinear refractive index at the time when the difference value is minimized is determined to be the true value of the nonlinear refractive index of the material of the optical waveguide, and the process moves on to S209.

In S209, the nonlinear refractive index of the two-dimensional material is set to a provisional value this time, the nonlinear refractive index of the material of the optical waveguide is fixed at the true value determined in S208, and the theoretical value of the nonlinear coefficient $\gamma_2$ is acquired through an electrical field analysis using a numerical calculation method such as a finite element method or a time domain difference method.

Next, in S210, the difference between the actual-measurement-based nonlinear coefficient $\gamma_2$ obtained in S203 and the theoretical-value-based nonlinear coefficient $\gamma_2$ obtained in S209 is evaluated.

In S211, the difference value obtained in S210 is compared with a second predetermined value. If the difference value is equal to or greater than the second predetermined value (threshold) (Y), the process moves on to S212, and the provisional value of the nonlinear refractive index of the two-dimensional material that has been set in S209 is changed. Steps S209 to 211 are repeated, using the updated provisional value of the nonlinear refractive index. If the difference value is smaller than the second predetermined value (N), the process moves on to S213.

In S213, the provisional value of the nonlinear refractive index at the time when the difference value is minimized is determined to be the true value of the nonlinear refractive index of the two-dimensional material, and the nonlinear optical properties measurement comes to an end in S214.

As described above, the nonlinear refractive index of the base material (S204 to 208) and the nonlinear refractive index of the two-dimensional material (S209 to 213) can be determined separately from each other.

Next, a more specific configuration of a measurement system capable of implementing the method for measuring the nonlinear optical properties of a two-dimensional material according to the present disclosure will be further described.

Example 1

Figure 4:
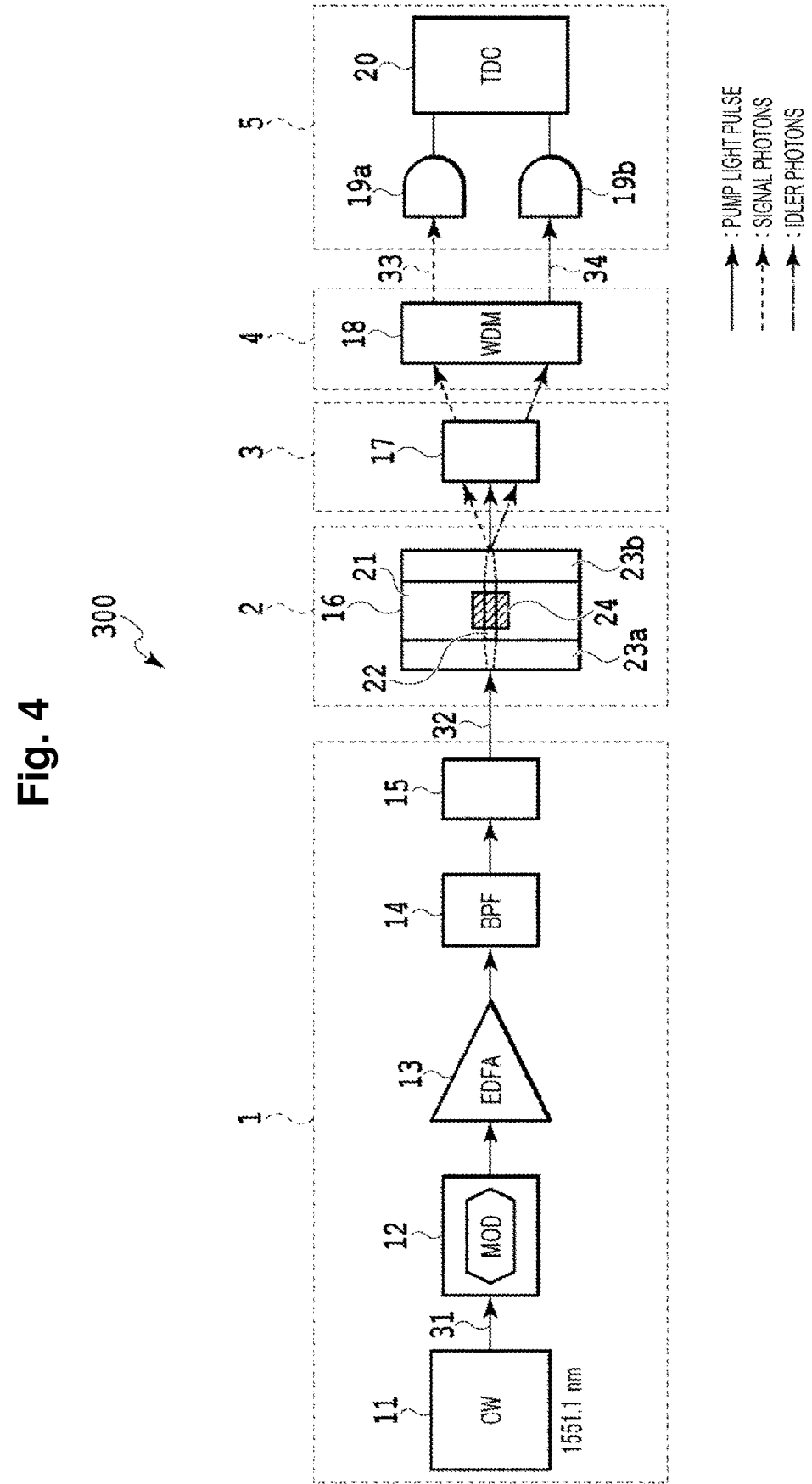
FIG. 4 is a diagram illustrating a measurement system of an example using a graphene-loaded silicon optical waveguide.

FIG. 4 is a diagram illustrating an example configuration of a system for measuring nonlinear optical properties of graphene, using a graphene-loaded silicon optical waveguide. The measurement system 300 has a configuration corresponding to the measurement system 100 illustrated in FIG. 1, and indicates a more specific example configuration of each component. That is, the measurement system 300 includes a pump light pulse generation unit 1, an optical waveguide 2 partially loaded with a two-dimensional material, a pump light pulse filter 3, a filter 4 that separates generated photon pairs, and a detection unit 5.

The pump light pulse generation unit 1 includes a continuous wave (CW) laser 11, a light intensity modulator 12, an erbium-doped optical fiber amplifier (EDFA) 13, a bandpass filter (BPF) 14, and a fiber polarization controller 15. The fiber-optic coupling CW laser 11 that is a light source outputs CW light 31 of 1551.1 nm in wavelength. With the light intensity modulator 12, the CW light 31 is modulated into a light pulse having a duration of 20 ps and a repetition frequency of 1 GHz. The optical power of the pulse modulated optical wave is amplified to an appropriate level with the EDFA 13. Further, with the BPF 14, the spontaneous emission light amplified by the EDFA 13 is removed. The light output from the BPF 14 is adjusted to TE polarized light with the fiber polarization controller 15, and a pump light pulse 32 is input to the optical waveguide 2.

The optical waveguide 2 is a test device 16 including a graphene-loaded silicon optical waveguide, and overcladdings 23a and 23b formed with $SiO_2$ are formed on the entry side and the exit side of the silicon optical waveguide. The central portion of the silicon optical waveguide of the test device 16 has an air-clad structure using air as a cladding, and a two-dimensional material 24 is partially loaded on a core 22. The pump light pulse 32 enters via a lensed fiber into a spot size converter that is formed on the entry side of the core 22.

As the pump light pulse 32 propagates through the core 22 of the graphene-loaded silicon optical waveguide of the test device 16, photon pairs (signal photons and idler photons) are generated from the pump light pulse. In the case of an air-clad optical waveguide, a near field is formed, and light propagates not only inside the core but also partially outside the core. When the evanescent light and the two-dimensional material come into contact with each other, a nonlinear optical phenomenon occurs not only in the optical waveguide but also in the attached two-dimensional material, and photon pairs are generated through a spontaneous four-wave mixing process.

The pump light pulse and the generated photon pairs indicated by three arrows are emitted via a spot size converter formed on the exit side of the silicon optical waveguide of the test device 16 into a lensed fiber.

The emitted pump light pulse is removed with a notch filter 17 that corresponds to the pump light pulse filter 3. The photon pairs transmitted through the notch filter 17 are separated into signal photons (1546.1 nm) and idler photons (1556.0 nm) by a wavelength division multiplexing (WDM) filter 18 (the photon pair separation filter 4) having a bandwidth of 0.12 THz, and are then made to enter the detection unit 5. The detection unit 5 detects signal photons 33 and idler photons 34 with single-photon detectors 19a and 19b, respectively, and the coincidence rate is measured with a time-to-digital converter (TDC) 20.

Although the optical nonlinearity measurement method and the configuration of the measurement system of the present disclosure have been specifically described on the basis of a flowchart and an example, the present invention is not limited to the above-described procedures and example, and various modifications can be made. For example, in the test device of the above-described example, graphene is used as the two-dimensional material. However, nonlinear optical properties can also be measured even if some other two-dimensional material (boron nitride, molybdenum sulfide, tungsten sulfide, or the like) is used.

In the above example, silicon is used as the material of the optical waveguide, but some other material (silica, silicon nitride, gallium arsenide, indium phosphide, or the like) can also be used. In a case where only the nonlinear optical properties of a two-dimensional material are to be measured, a material such as silica having the lowest possible nonlinear refractive index is preferably used as the material of the optical waveguide to be loaded with the two-dimensional material.

Further, in the measurement system of the above-described example, a relatively highly available optical element of a communication wavelength band is used. However, with an optical element of some other wavelength band, nonlinear optical properties can also be measured, as long as the spontaneous four-wave mixing process can be used.

Photon pair generation through the spontaneous four-wave mixing process in the measurement method according to the present disclosure is a nonlinear optical phenomenon that satisfies the phase matching conditions, and the contribution of the optical nonlinearity derived from free carriers is restricted only to indirect influence such as phase modulation of pump light. Thus, it is possible to measure optical nonlinearity while reducing the contribution of optical nonlinearity derived from free carriers.

Since the theoretical formula of the coincidence rate of photon pairs based on the coupled wave equation in the measurement method according to the present disclosure includes the parameter dependence in the optical waveguide axial direction, the nonlinear coefficients $\gamma_1$ and $\gamma_2$ of the optical waveguide and the optical waveguide loaded with a two-dimensional material can be measured separately from each other.

INDUSTRIAL APPLICABILITY

The present invention can be used in measuring the optical nonlinearity of a two-dimensional material applicable to an optical device.

The invention claimed is:

1. A method for measuring nonlinear optical properties of a two-dimensional material comprising graphene, the method comprising:

providing a plurality of test devices that have different structures and each include an optical waveguide partially loaded with a two-dimensional material, each two-dimensional material having a different length in an optical waveguide axial direction, wherein an overcladding is provided on an entry side and on exit side of the optical waveguide;

measuring a coincidence rate of a photon pair generated in the optical waveguide after pump light pulse generated by a pump light pulse generation unit has entered the optical waveguide in each of the test devices;

obtaining a curve of a theoretical-value-based coincidence rate with respect to a length of the two-dimensional material based on at least a duration and a peak power of the pump light pulse, a total length of the optical waveguide, and a length of the loaded two-dimensional material;

fitting the curve of the theoretical-value-based coincidence rate to an actual-measurement-based coincidence rate corresponding to the different length, comprising obtaining a difference between the curve and a plurality of plotted points of the measured coincidence rate for the different length of the two-dimensional material, determining a fitting between the curve and the plurality of plotted points;

when the fitting occurs, determining a nonlinear coefficient $\gamma_1$ of the optical waveguide and a nonlinear coefficient $\gamma_2$ of the optical waveguide loaded with the two-dimensional material; and obtaining a nonlinear refractive index of the two-dimensional material and a nonlinear refractive index of a material of the optical waveguide based on the nonlinear coefficient $\gamma_1$ and the nonlinear coefficient $\gamma_2$.

2. The method according to claim 1, wherein the photon pair is composed of a signal photon and an idler photon, and is generated through a spontaneous four-wave mixing process in which the photon pair satisfies a phase matching condition in relation to the pump light pulse.

3. The method according to claim 1, wherein the theoretical-value-based coincidence rate is calculated according to a theoretical formula:

$$\mu_{theory} = \Delta v \Delta \tau G^2 \eta^2$$

$$G = P_p$$

$$\left[ \gamma_1 \frac{1-e^{-\alpha_1 L_1}}{\alpha_1} + \gamma_2 e^{-\alpha_1 L_1} \frac{1-e^{-\alpha_2 L_2}}{\alpha_2} + \gamma_1 e^{-\alpha_1 L_1} e^{-\alpha_2 L_2} \frac{1-e^{-\alpha_1(L-L_1-L_2)}}{\alpha_1} \right]$$

$$\eta = e^{-\alpha_1(L-L_2)} e^{-\alpha_2 L_2}$$

where $\Delta v$ represents a bandwidth of a filter that separates the generated photon pair,
$\Delta \tau$ represents a duration of the pump light pulse,
$P_p$ represents a peak power of the pump light pulse,
$\gamma_1$ represents the nonlinear coefficient of the optical waveguide,
$\gamma_2$ represents the nonlinear coefficient of the optical waveguide loaded with the two-dimensional material,
$\alpha_1$ represents a propagation loss $\alpha$ of the waveguide,
$\alpha_2$ represents a propagation loss of the optical waveguide loaded with the two-dimensional material,
L represents a total length of the optical waveguide,
$L_1$ represents a length of the optical waveguide on an entry side, and
$L_2$ represents a length of the loaded two-dimensional material.

4. The method according to claim 1, wherein the obtaining the nonlinear refractive index of the two-dimensional material and the nonlinear refractive index of a material of the optical waveguide further comprises:

setting a provisional value of a nonlinear refractive index of a material of the optical waveguide;

calculating a theoretical value of the nonlinear coefficient $\gamma_1$ from an electrical field distribution in a cross-sectional direction of the optical waveguide on a basis of the provisional value, the electrical field distribution being obtained through numerical calculation;

evaluating a difference between the nonlinear coefficient $\gamma_1$ obtained by the fitting and the theoretical value of the nonlinear coefficient $\gamma_1$ obtained from the electrical field distribution;

updating the provisional value, when the difference is equal to or larger than a first predetermined value;

determining a current provisional value to be a true value of the nonlinear refractive index of the material of the optical waveguide, when the difference does not exceed the first predetermined value;

setting a provisional value of a nonlinear refractive index of the two-dimensional material;

calculating a theoretical value of the nonlinear coefficient $\gamma_2$ from an electrical field distribution in the cross-sectional direction of the optical waveguide on a basis of the provisional value of the nonlinear refractive index of the two-dimensional material and the true value of the nonlinear refractive index of the optical waveguide, the electrical field distribution being obtained through numerical calculation;

evaluating a difference between the nonlinear coefficient $\gamma_2$ obtained by the fitting and the theoretical value of the nonlinear coefficient $\gamma_2$ obtained from the electric field distribution;

updating the provisional value, when the difference is equal to or larger than a second predetermined value; and determining the current provisional value to be a true value of the nonlinear refractive index of the two-dimensional material, when the difference does not exceed the second predetermined value.

\* \* \* \* \*